(12) United States Patent
Newstead et al.

(10) Patent No.: US 11,584,187 B2
(45) Date of Patent: Feb. 21, 2023

(54) VEHICLE SUSPENSION SYSTEM

(71) Applicant: The Dynamic Engineering Solution Pty Ltd, Holden Hill (AU)

(72) Inventors: Michael Newstead, Holden Hill (AU); Max O'Connell, Holden Hill (AU); Phillip Kuys, Holden Hill (AU); Oscar Fiorinotto, Holden Hill (AU)

(73) Assignee: The Dynamic Engineering Solution Pty Ltd, Holden Hill (AU)

(*) Notice: Subject to any disclaimer, the term of this patent is extended or adjusted under 35 U.S.C. 154(b) by 338 days.

(21) Appl. No.: 16/905,269

(22) Filed: Jun. 18, 2020

(65) Prior Publication Data
US 2020/0398632 A1     Dec. 24, 2020

(30) Foreign Application Priority Data
Jun. 20, 2019 (AU) .............................. 2019902161

(51) Int. Cl.
*B60G 17/08* (2006.01)
*B60G 15/12* (2006.01)
*B60G 17/052* (2006.01)

(52) U.S. Cl.
CPC ............ *B60G 17/08* (2013.01); *B60G 15/12* (2013.01); *B60G 17/052* (2013.01); *B60G 2202/152* (2013.01); *B60G 2202/24* (2013.01); *B60G 2204/62* (2013.01); *B60G 2206/41* (2013.01);
(Continued)

(58) Field of Classification Search
None
See application file for complete search history.

(56) References Cited

U.S. PATENT DOCUMENTS

| 2,755,966 A | 7/1956 | Lindars |
| 5,097,916 A | 3/1992 | Brandstadter |
| 6,152,432 A | 11/2000 | Perrin |
| (Continued) |

FOREIGN PATENT DOCUMENTS

| DE | 4017659 A1 | 12/1991 |
| EP | 1117548 B1 | 11/2003 |
| (Continued) |

OTHER PUBLICATIONS

Kaller Hydrop Gas Hydraulic Suspension System; Lightweight solutions for heavyweight champions; brochure; published prior to the priority date of the application.

*Primary Examiner* — Faye M Fleming
(74) *Attorney, Agent, or Firm* — Avek IP, LLC; Kent R. Erickson

(57) ABSTRACT

A vehicle suspension system comprising a hydropneumatic strut comprising a fluid interface, where supply of hydraulic fluid to the strut via the fluid interface causes the overall length of the strut to increase, and withdrawal of hydraulic fluid via the fluid interface causes the overall length of the strut to decrease, a first displacement system in fluid communication with the fluid interface, capable of supplying and withdrawing fluid to and from the strut as well as measuring the volume of fluid supplied or withdrawn from the strut, a second displacement system in fluid communication with the fluid interface, and a hydraulic fluid source for selectively supplying or withdrawing hydraulic fluid from the hydropneumatic strut via either of the first or second displacement systems.

7 Claims, 7 Drawing Sheets

(52) U.S. Cl.
CPC .. *B60G 2400/5182* (2013.01); *B60G 2500/10* (2013.01)

(56) References Cited

U.S. PATENT DOCUMENTS

| | | | |
|---|---|---|---|
| 6,389,341 B1 * | 5/2002 | Davis | B60G 21/067 |
| | | | 188/274 |
| 6,416,061 B1 | 7/2002 | French et al. | |
| 7,240,906 B2 | 7/2007 | Klees | |
| 7,252,181 B2 * | 8/2007 | Lemmens | B60G 17/04 |
| | | | 280/5.503 |
| 7,416,189 B2 * | 8/2008 | Wilde | B60G 17/08 |
| | | | 280/124.16 |
| 8,342,302 B2 | 1/2013 | McAndrews et al. | |
| 8,640,835 B2 | 2/2014 | Holman et al. | |
| 8,672,337 B2 | 3/2014 | van der Knaap et al. | |
| 8,894,050 B2 | 11/2014 | Wootten et al. | |
| 9,080,631 B2 | 7/2015 | Hoult | |
| 9,884,533 B2 * | 2/2018 | Blankenship | F16F 9/463 |
| 9,981,712 B2 | 5/2018 | Barefoot | |
| 10,113,603 B2 | 10/2018 | Smith | |
| 10,166,832 B2 * | 1/2019 | DeBruler | B60G 17/0155 |
| 10,350,956 B2 | 7/2019 | Dillman et al. | |
| 2008/0093818 A1 | 4/2008 | Nykanen et al. | |
| 2018/0134107 A1 | 5/2018 | Holst et al. | |
| 2019/0178695 A1 | 6/2019 | Bittner et al. | |

FOREIGN PATENT DOCUMENTS

| | | | |
|---|---|---|---|
| EP | 1403530 A2 | 3/2004 | |
| EP | 1419910 A2 | 5/2004 | |
| EP | 1693234 A2 | 8/2006 | |
| EP | 1693234 A3 | 2/2008 | |
| EP | 1368580 B9 | 12/2009 | |
| EP | 2338777 A1 | 6/2011 | |
| EP | 3594528 B1 * | 4/2022 | B60G 15/14 |
| FR | 2697474 A1 * | 5/1994 | B60G 21/0556 |
| KR | 102185228 B1 * | 7/2022 | B60G 17/0157 |
| WO | 2009151398 A1 | 12/2009 | |
| WO | 2018060730 A1 | 4/2018 | |
| WO | 2019097211 A1 | 5/2019 | |

* cited by examiner

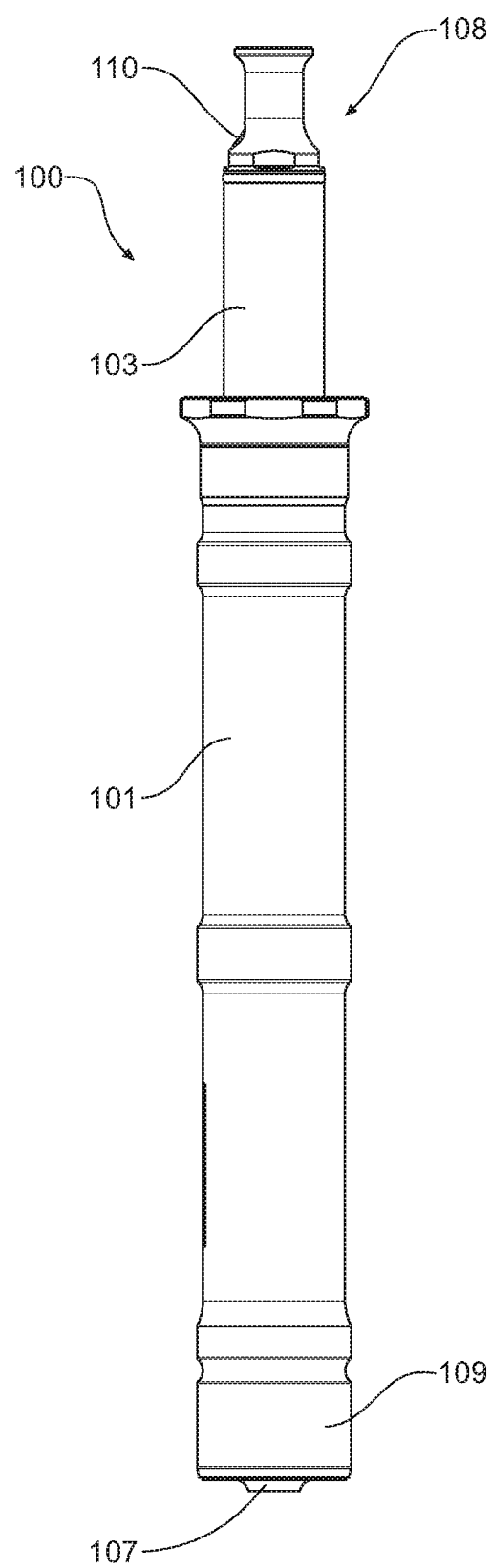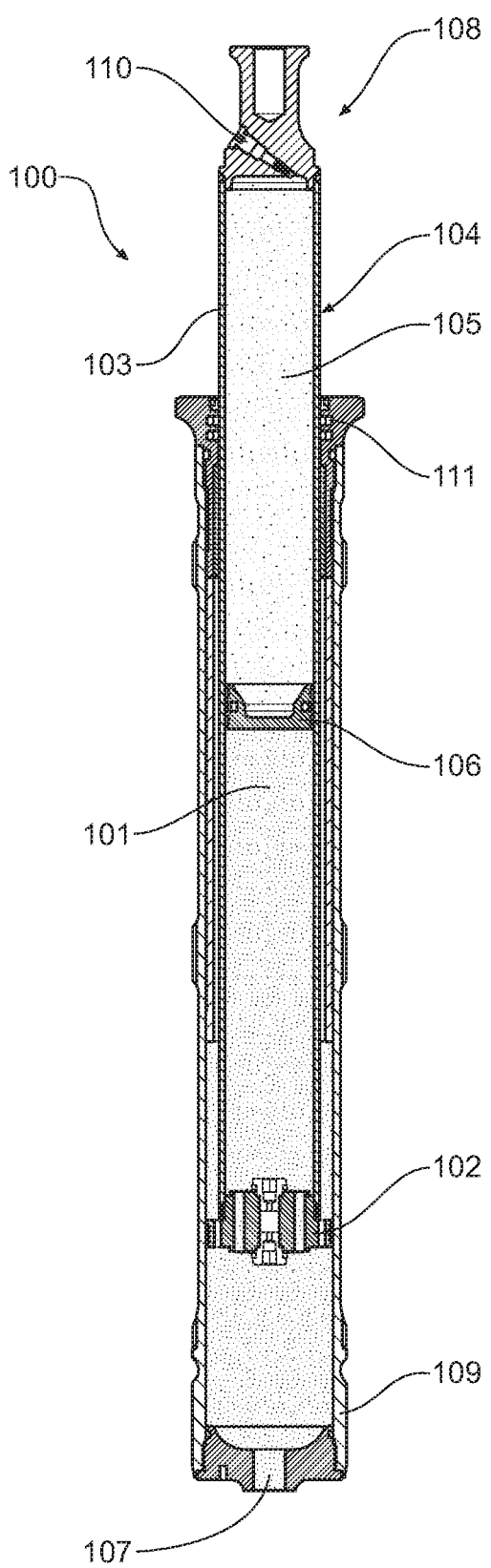
*Figure 2*          *Figure 3*

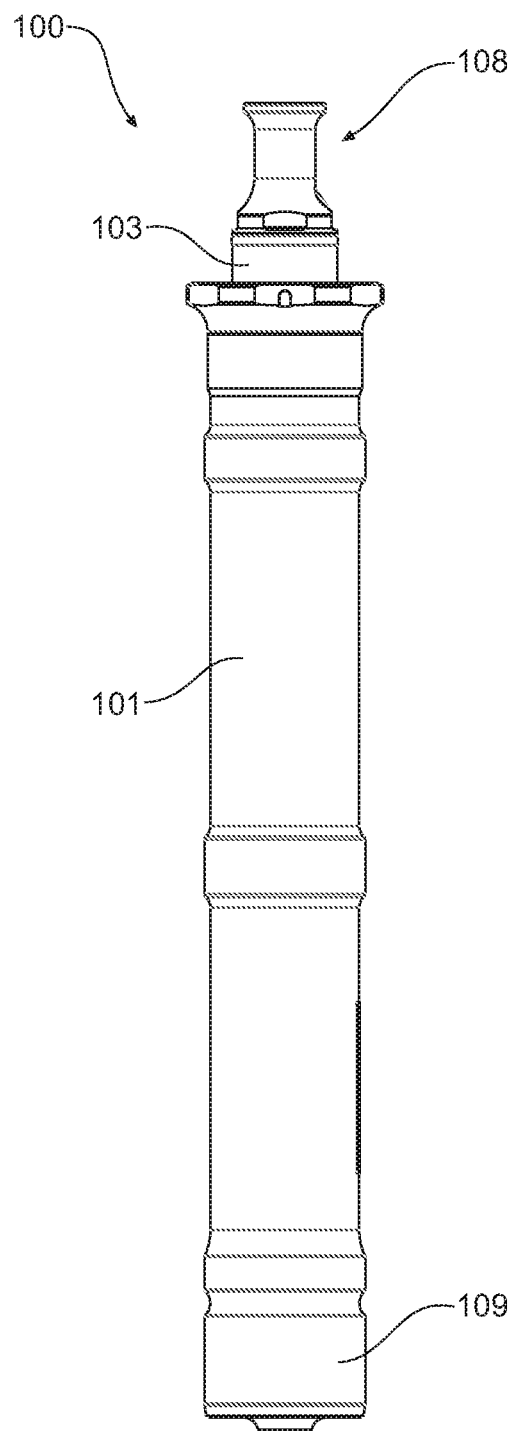
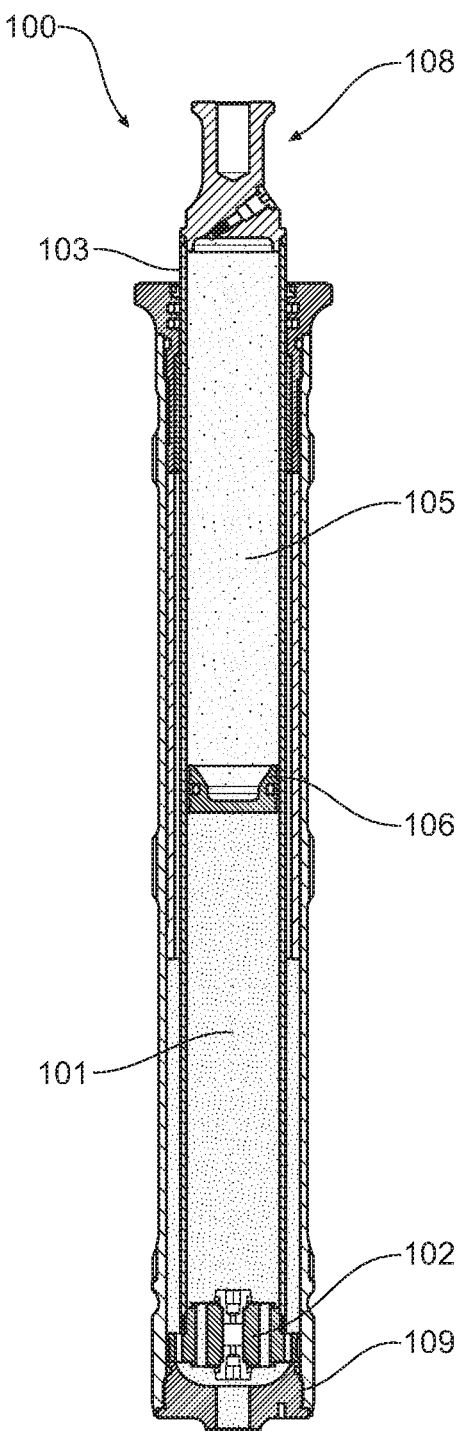
*Figure 4*     *Figure 5*

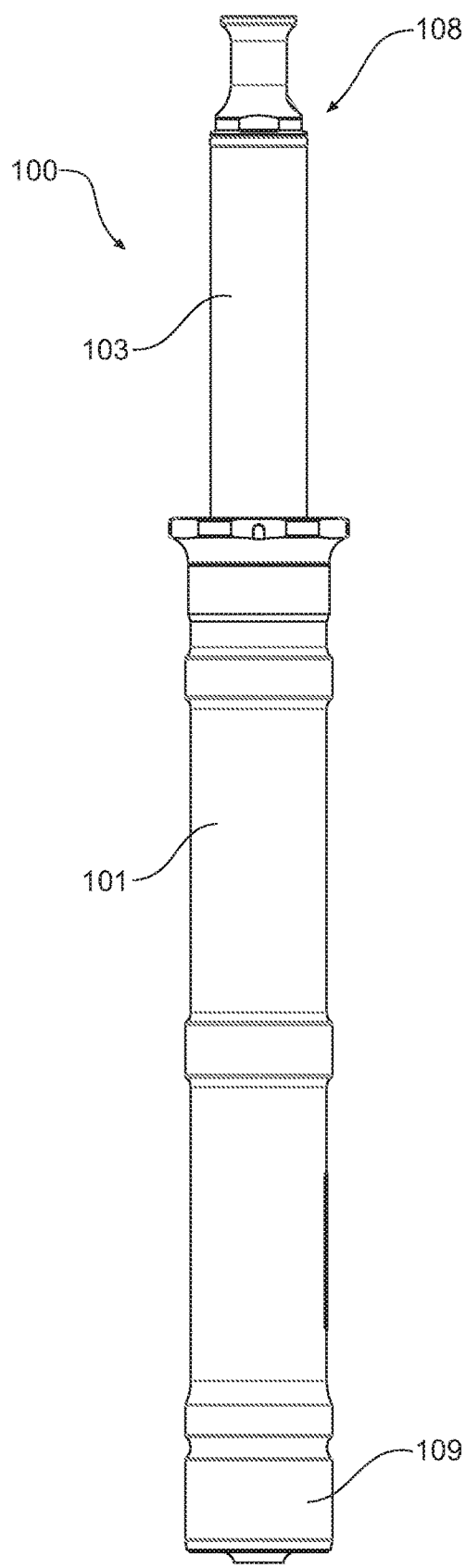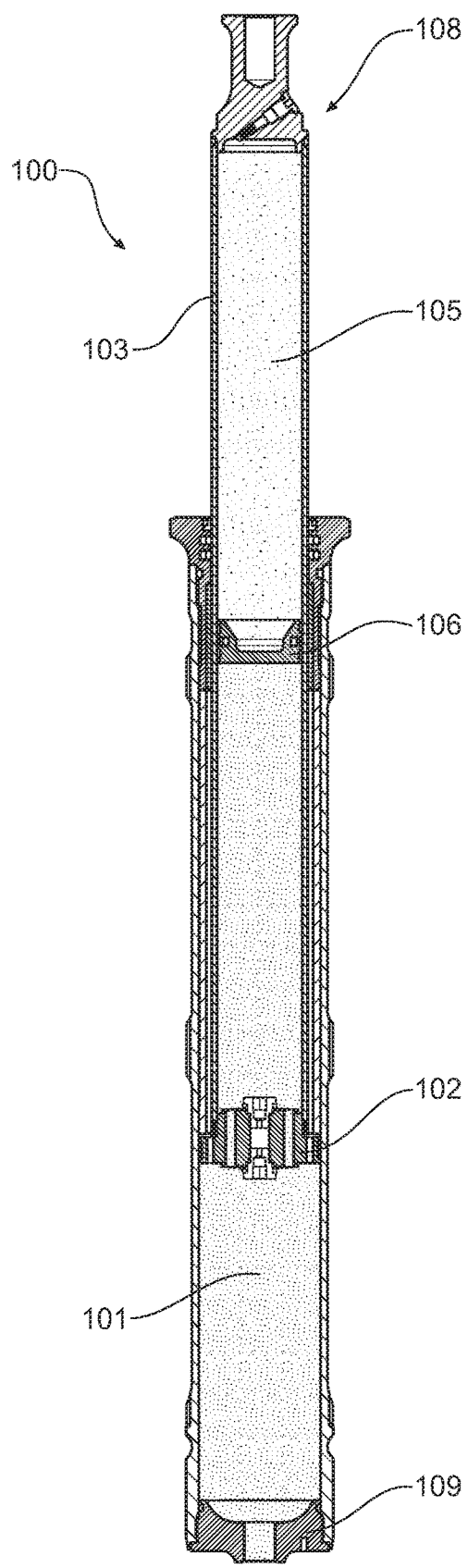
*Figure 6*  *Figure 7*

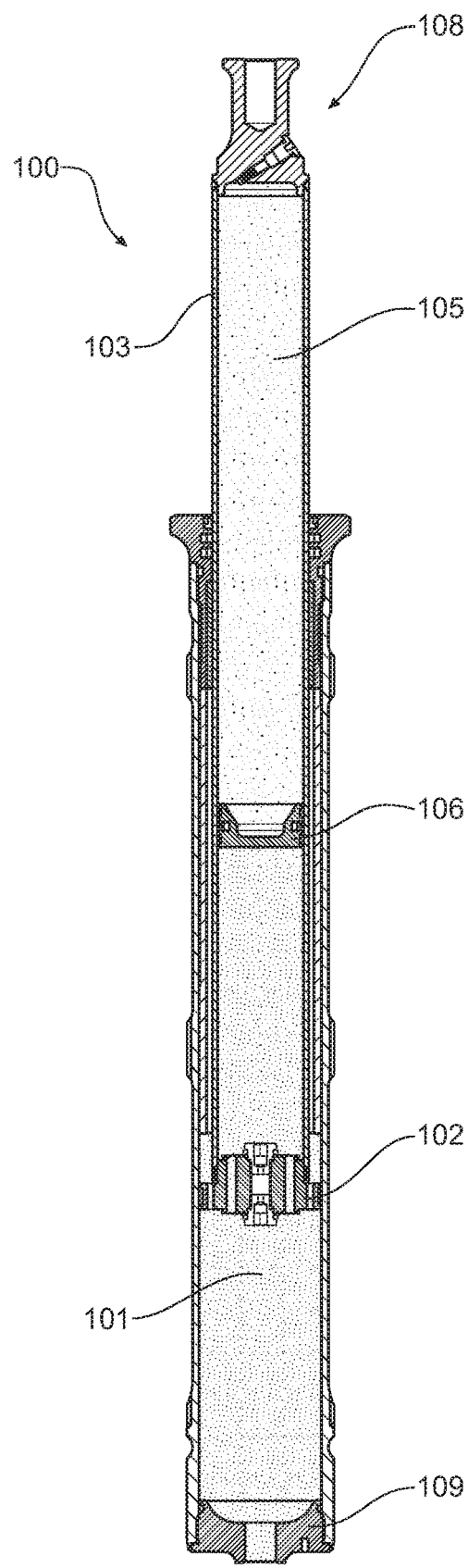 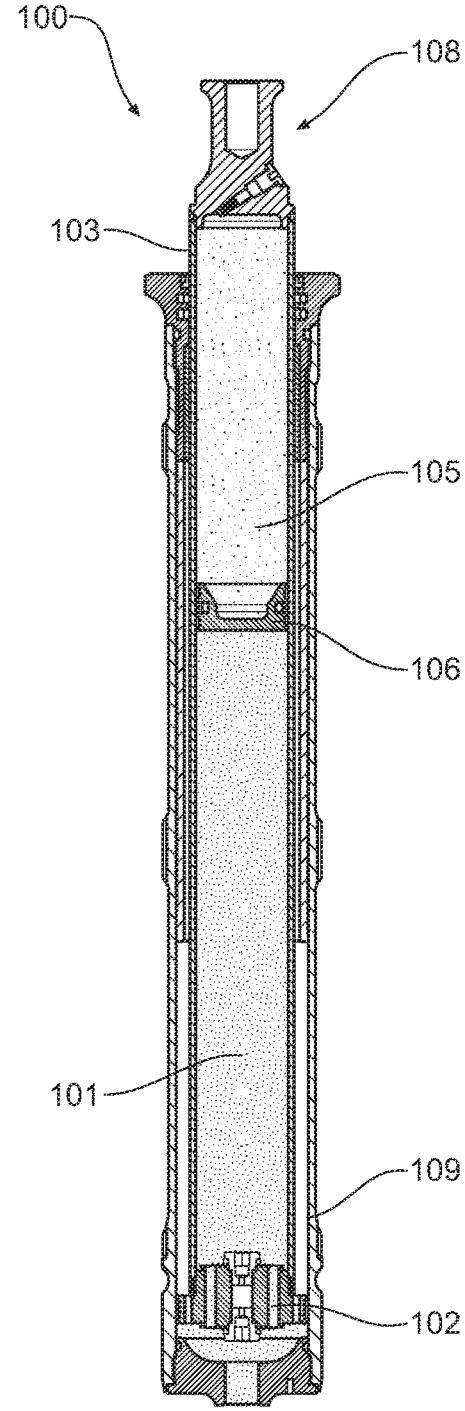
*Figure 8*  *Figure 9*

VEHICLE SUSPENSION SYSTEM

CROSS-REFERENCE TO RELATED APPLICATIONS

The present application claims priority from Australian Provisional Patent Application No. 2019902161 titled "VEHICLE SUSPENSION SYSTEM" and filed on 20 Jun. 2019, the content of which is hereby incorporated by reference in its entirety.

TECHNICAL FIELD

The present invention relates to a vehicle suspension system. In a particular form the present invention relates to an adjustable hydropneumatic vehicle suspension system.

BACKGROUND

A vehicle suspension system typically comprises a spring and a hydraulic damper or strut. While in many examples the spring is in the form of a linearly wound coil spring, a leaf spring or a torsion bar, another example makes use of a pneumatic spring (which uses a gas volume as an elastic medium) in combination with a hydraulic damper or strut, commonly referred to as a hydropneumatic strut.

It is desirable for a vehicle suspension system to be capable of static ride height levelling. This functionality means the vehicle can be lowered or raised to allow aerodynamic advantages, increased ground clearance, passenger/cargo loading, lowering total vehicle height for ensuring overhead clearance, or ride levelling responsive to variable loading.

It is also desirable for a vehicle suspension system to be capable of compensating for a vehicle's natural roll, pitch and heave motion, as well as being able to be used in a "Skyhook" system by lifting or lowering individual wheels over road obstacles in order to reduce passenger discomfort.

It is against this background that the present disclosure has been developed.

SUMMARY

According to a first aspect, there is provided a vehicle suspension system comprising a hydropneumatic strut comprising a fluid interface, where supply of hydraulic fluid to the strut via the fluid interface causes the overall length of the strut to increase, and withdrawal of hydraulic fluid via the fluid interface causes the overall length of the strut to decrease, a first displacement system in fluid communication with the fluid interface, capable of supplying and withdrawing fluid to and from the strut as well as measuring the volume of fluid supplied or withdrawn from the strut, a second displacement system in fluid communication with the fluid interface, and a hydraulic fluid source for selectively supplying or withdrawing hydraulic fluid from the hydropneumatic strut via either of the first or second displacement systems.

In one form, the vehicle suspension system is further configured to selectively connect either of the first or second displacement systems to the hydraulic fluid source.

In one form, the hydropneumatic strut further comprises a damper cylinder in connection with the fluid interface and a piston assembly comprising a piston slidably retained within the damper cylinder, a piston rod for driving the piston within the damper cylinder, and a pneumatic spring located within the piston rod, the pneumatic spring comprising a gas chamber filled with a gas and a separator piston slidably retained within the piston rod and configured to separate the hydraulic fluid and the gas, and wherein either the supply or withdrawal of fluid from the damper cylinder causes a displacement of the piston assembly with respect to the damper cylinder, resulting in an increase or decrease in the overall length of the strut.

In one form, the hydropneumatic strut further comprises a means for actively controlling bump and rebound damping characteristics.

In one form, the first displacement system is used to actively displace the piston assembly in response to road conditions, and the second displacement system is used control static displacement of the piston assembly.

In one form, the first displacement system is in the form of a volumetric displacement system comprising a cylinder comprising a first fluid interface in fluid communication with the hydraulic fluid source, and a second fluid interface in fluid communication with the fluid interface of the strut, a piston slidably retained within the cylinder and configured to move along the length of the cylinder between the first and second fluid interfaces in response to fluid displacement in the hydraulic damper, and a sensor for detecting the position of the displacement piston within the cylinder, wherein withdrawal of fluid from the strut will cause the displacement piston to move toward the first fluid interface, and supply of fluid to the strut will cause the displacement piston to move toward the second fluid interface, such that the volume of fluid supplied to or withdrawn from the strut is able to be calculated according to the position of the displacement piston within the cylinder.

In one form, the volumetric displacement system further comprises a pressure sensor for measuring hydraulic pressure in the strut.

In one form, the vehicle suspension system further comprises a hydraulic system for supplying and withdrawing fluid from the first and second fluid displacement systems, the hydraulic system configured to adjustably control the supply or withdrawal of hydraulic fluid to and from the first and second displacement systems.

In one form, the hydraulic system comprises a hydraulic pressure source and a hydraulic reservoir, and wherein hydraulic fluid is supplied to the strut by the hydraulic pressure source, and is withdrawn from the strut to the hydraulic reservoir.

According to a second aspect, there is provided a volumetric displacement system for measuring the volumetric displacement of hydraulic fluid in a hydropneumatic strut, the system comprising a cylinder comprising a first fluid interface in fluid communication with a hydraulic fluid source, and a second fluid interface in fluid communication with the strut, a piston slidably retained within the cylinder and configured to move along the length of the cylinder between the first and second fluid interfaces in response to fluid displacement in the strut, and a sensor for detecting the position of the piston within the cylinder, wherein a reduction in the volume of hydraulic fluid in the strut will cause the displacement piston to move toward the first fluid interface, and an increase in the volume of hydraulic fluid in the strut will cause the displacement piston to move toward the second fluid interface.

BRIEF DESCRIPTION OF DRAWINGS

Embodiments of the present invention will be discussed with reference to the accompanying drawings wherein:

FIG. 2 is a side view of a hydropneumatic strut, according to an embodiment;

FIG. 3 is a cross-sectional view of the hydropneumatic strut;

FIG. 4 is a side view of the hydropneumatic strut in a lowered state;

FIG. 5 is a cross-sectional view of the hydropneumatic strut in a lowered state;

FIG. 6 is a side view of the hydropneumatic strut in an extended state;

FIG. 7 is a cross-sectional view of the hydropneumatic strut in an extended state;

FIG. 8 is a cross-sectional view of the hydropneumatic strut in rebound;

FIG. 9 is a cross-sectional view of the hydropneumatic strut in bump;

DESCRIPTION OF EMBODIMENTS

Figure 1:
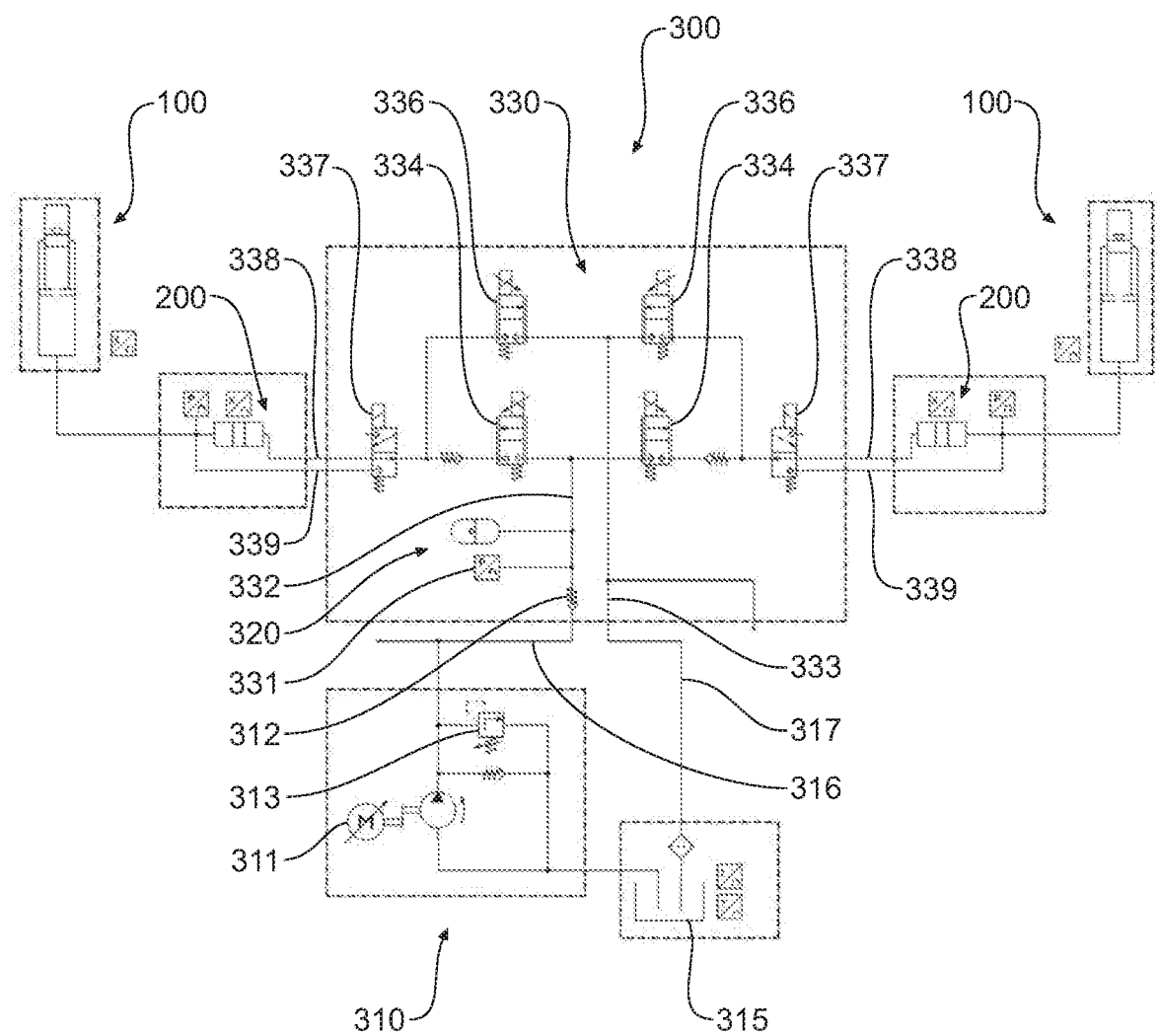
FIG. 1 is a schematic of a vehicle suspension system, according to an embodiment.
Figure 10:
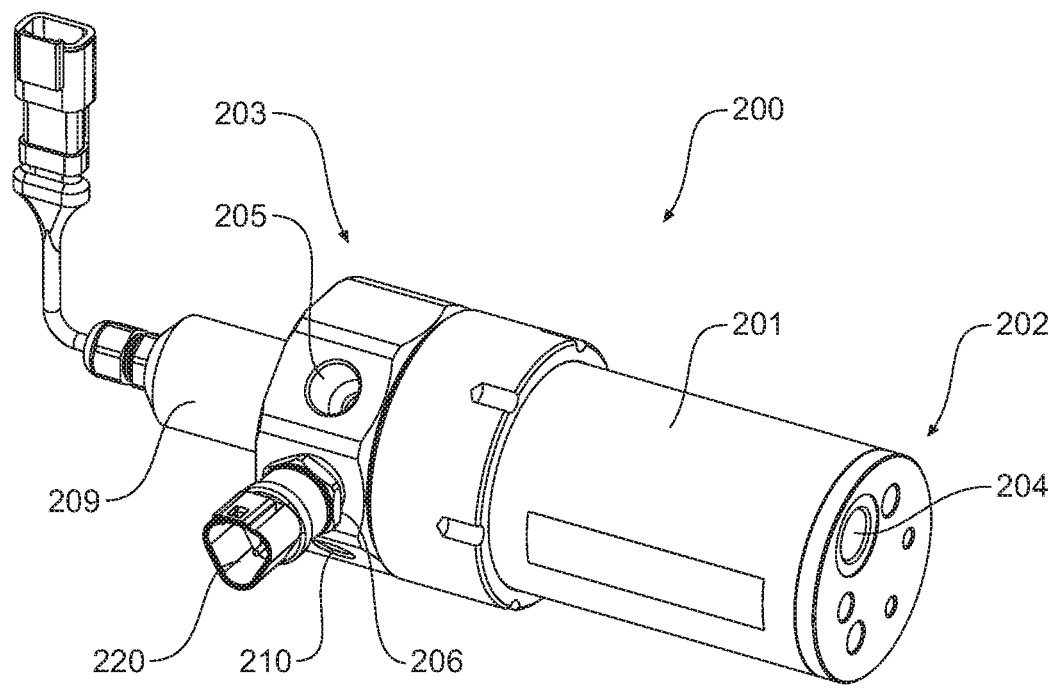
FIG. 10 is a perspective view of a volumetric displacement system, according to an embodiment.

Referring now to FIG. 1, there is shown a schematic of a vehicle suspension system, according to an embodiment, the suspension system comprising a hydropneumatic strut 100 (as shown in FIGS. 2 to 9) comprising a damper cylinder 101 containing a fluid (such as hydraulic oil); a fluid interface 107 in connection with the damper cylinder 101 allowing for the supply or removal of fluid from the damper cylinder 101, and a piston assembly comprising a piston 102 slidably retained within the damper cylinder 101; a cylindrical piston rod 103 for driving the piston 102 within the damper cylinder 101 and a pneumatic spring 104 located within the piston rod 103, the pneumatic spring 104 comprising a gas chamber 105 filled with a gas (such as air or nitrogen) and a separator piston 106 slidably retained within the piston rod 103 and configured to separate the fluid and the gas. It will be appreciated that supply or removal of fluid to or from the damper cylinder 101 via the fluid interface 107 will cause displacement of the piston assembly with respect to the damper cylinder 101, altering the overall length of the strut.

As will be described in further detail below, the system comprises first and second displacement systems in fluid communication with the fluid interface, where the first displacement system is capable of supplying and withdrawing fluid to and from the strut as well as measuring the volume of fluid supplied or withdrawn from the strut and is responsible for controlling active displacement of the piston assembly, and the second displacement system is responsible for controlling static displacement of the piston. As will be described in further detail below, the first and second displacement systems are in connection with a hydraulic fluid source capable of selectively supplying or withdrawing hydraulic fluid from the strut via either of the first or second displacement systems.

Referring now to FIGS. 2 to 9, where the hydropneumatic strut 100 is shown in further detail. It can be seen that the top of the piston rod 103 features a top mount 108 configured to be fixed to a vehicle chassis. Also located at the top of the piston rod 103 is a gassing valve and seal 110 configured to connect to the gas chamber 105, in order to charge the chamber to a desired operating pressure. It can also be seen that the bottom of the damper cylinder 101 features a bottom mount 109 configured to be fixed to a vehicle axle, or wheel assembly. Also located at the bottom of the damper cylinder 101 is the fluid interface 107. It will also be appreciated that fluid is prevented from leaking from the damper cylinder 101 by virtue of fluid seals 111 located between the outer surface of the piston rod 103 and the inner surface of the damper cylinder 101.

The piston 102 features a bump port and bump shims (not shown) which provide damping resistance when the piston moves in bump. The piston 102 also features a rebound port and rebound shims (not shown), which provide damping resistance when the piston 102 moves in rebound. It will be appreciated that, as the piston 102 moves in bump (as best shown in FIG. 9) the piston rod 103 enters the damper cylinder, reducing the internal fluid volume capacity, and this volume of oil is taken up by the pneumatic spring 104 compressing. Conversely, as the piston moves in rebound (as best shown in FIG. 8) the piston rod 103 withdraws from the damper cylinder, increasing the internal fluid volume capacity, allowing the pneumatic spring 104 to expand.

While the present invention teaches a hydropneumatic strut with passive damping capabilities, it will be appreciated that an alternative hydropneumatic strut capable of individual and active adjustment of the bump and rebound damping characteristics could also be employed, where instead of the piston featuring bump and rebound ports, bump and rebound resistance is performed via bump and rebound check valves and proportional damping valves and configured such that when the piston assembly is moving in bump, the piston causes fluid to pass through the bump damping valve and check valve and when the piston assembly is moving in rebound, the piston causes fluid to pass through the rebound damping valve and check valve. It will be appreciated that by virtue of the adjustability of the bump and rebound damping valves, that active control of the damping characteristics of the strut are also achievable.

While the remainder of this description will describe the relationship between the strut 100 and the hydraulic system 300, it will be appreciated that the same relationship applies between alternate struts and the hydraulic system 300.

Referring again to FIG. 1, the hydraulic system 300 will now be described in further detail. The hydraulic system 300 comprises a hydraulic pressure source in the form of a pump assembly 310 and a hydraulic accumulator 320. The pump assembly 310 comprising a hydraulic pump 311, a pressure relief valve 313 connecting the hydraulic pump 311 to a reservoir or tank 315. The pump assembly 310 features a high pressure outlet 316 for supplying high pressure fluid to the remainder of the system 300, and a low pressure inlet 317 for receiving low pressure fluid returned to the pump assembly 310 by the system 300. The pump assembly 310 also features a check valve 312, preventing fluid from returning to the pump 311 from the high pressure outlet 316.

In fluid communication with the outlet 316 of the pump assembly 310 is the hydraulic accumulator 320, which stores hydraulic pressure for use by the system 300. Both the hydraulic accumulator 320 and pump assembly are in fluid communication with a manifold assembly 330 via a manifold inlet 332, where pressure at this point in the system is monitored by an inlet pressure sensor 331. In fluid communication with the inlet 317 of the pump assembly 310 is the manifold outlet 333.

The manifold assembly 330 is connected to hydropneumatic struts 100 via first and second interfaces 338, 339. The first and second interfaces 338, 339 connect the manifold assembly to the first strut and second strut displacement systems respectively.

While in the embodiment shown, the manifold assembly 330 is connected to two struts 100, it will be appreciated that in alternative embodiments, more or less struts may be connected depending on the packaging requirements of the application. For instance, in one alternate embodiment, each strut may have its own hydraulic pressure source and manifold assembly. In a further embodiment, each strut may be connected to a single hydraulic pressure source, with a common manifold assembly.

For each hydropneumatic strut 100 connected to the manifold assembly 330, the manifold assembly comprises a first control valve 334, in fluid communication with the manifold inlet 332. The first control valve 334 is in the form of a normally closed proportional 2/2 solenoid with spring return, where, in a first position (spring return), the first control valve 334 is closed, and in a second position (solenoid active), the valve is open.

There is also provided a second control valve 336 in fluid communication with the manifold outlet 333. The second control valve 336 is also in the form of a normally closed proportional 2/2 solenoid with spring return, where, in a first position (spring return), the second control valve 336 is closed, and in a second position (solenoid active), the valve is open.

In fluid connection with both the first and second control valves 334, 336 is a switching valve 337, used to switch fluid communication with the manifold assembly between the first and second strut displacement systems, via the first and second interfaces 338, 339 respectively. The switching valve 337 is a 3/2 solenoid with spring return. In the spring return position, the switching valve 337 connects the manifold assembly 330 with the first strut displacement system via the first interface 338. In the solenoid active position, the switching valve 337 connects the manifold assembly 330 with the second strut displacement system via the second interface 339.

The first strut displacement system used to control and monitor active displacement of the piston assembly within the hydraulic cylinder is in the form of a volumetric displacement system (VDS) 200 as shown schematically in FIG. 1, and as an embodied in FIGS. 10 to 13. The displacement of the piston assembly (and therefore the overall length of the strut 100) is able to be actively adjusted to compensate for roll, pitch and heave of a vehicle. It can also be used in a "skyhook" system to reduce passenger discomfort by allowing individual wheels to "lift" over raised road obstacles (such as speed bumps) and then push them back down to the road surface and conversely push them down in to lowered road obstacles (such as potholes) and them allow them to "lift" back to the road surface. Based upon feedback from a variety of sensors deployed on the vehicle, hydraulic fluid is either supplied to or allowed to be displaced from the hydropneumatic strut 100 based upon the required position of the strut 100 calculated by a control system.

Referring to FIGS. 10 to 13, it can be seen that the VDS 200 comprises an elongate hydraulic cylinder 201 filled with fluid, the cylinder 201 comprising a first fluid interface 204 at a first end 202 and a second fluid interface 205 at its second end 203, where the first fluid interface 204 is in fluid communication with the first manifold interface 338 and the second fluid interface 205 is in fluid communication with the fluid interface 107 of the strut 100. The VDS 200 also features a third interface 206 in fluid communication with a pressure sensor 220 used to monitor hydraulic pressure in the strut 100 and a fourth interface 210 for connecting the second manifold interface to the strut 100 such that the same pressure sensor may be used to monitor hydraulic pressure in the strut 100 for both the first and second displacement systems.

Figure 11:
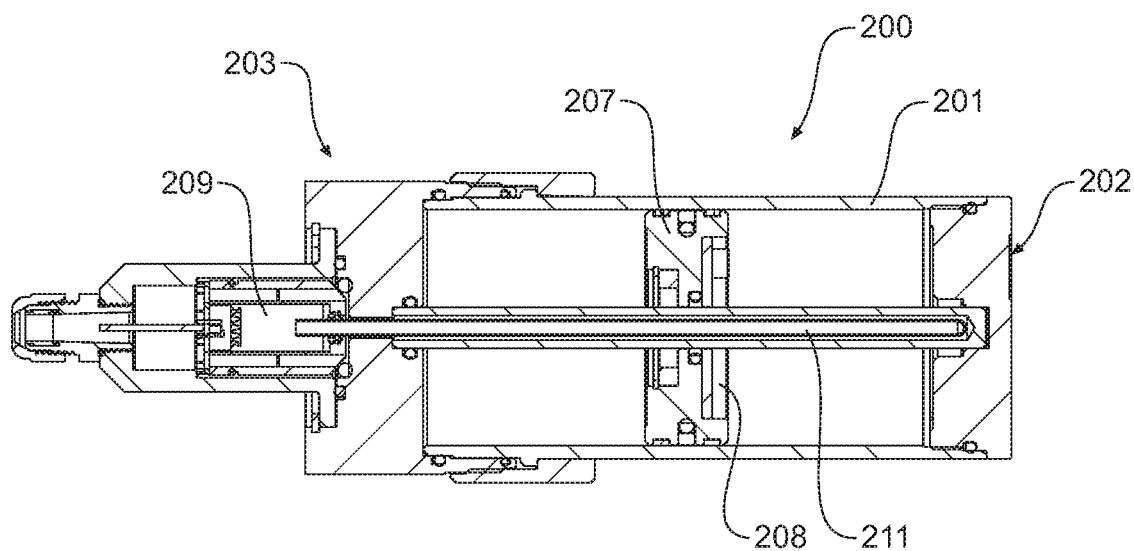
FIG. 11 is a cross-sectional view of the volumetric displacement system of FIG. 10.
Figure 12:
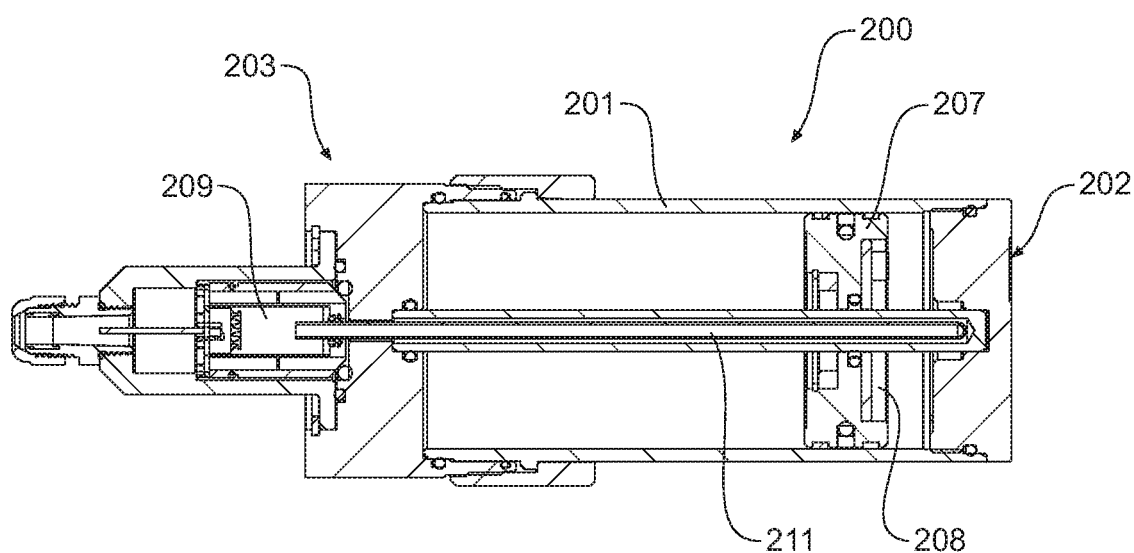
FIG. 12 is a cross-sectional view of the volumetric displacement system where the displacement piston has been moved in response to removal of fluid from the hydropneumatic strut.
Figure 13:
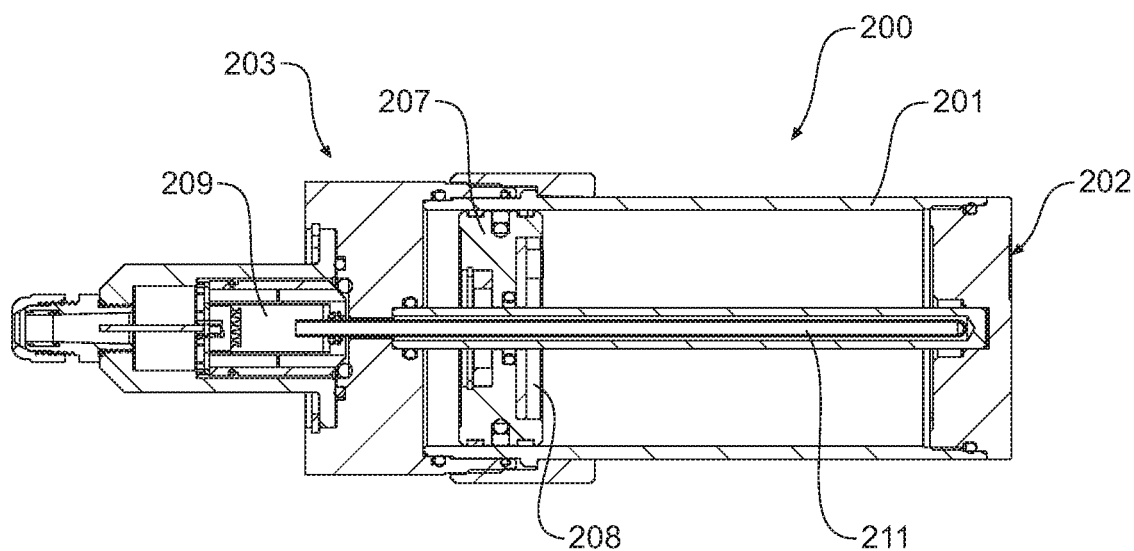
FIG. 13 is a cross-sectional view of the volumetric displacement system where the displacement piston has been moved in response to supply of fluid from the hydropneumatic strut.

As shown in FIGS. 11 to 13, a displacement piston 207 is slidably retained within the cylinder 201 and is configured to freely slide along a concentric rod 211 running along the length of the cylinder 201 in response to fluid displacement within the cylinder 201. It will be appreciated that as fluid is supplied to the VDS via the first fluid interface 204, the displacement piston 207 will be driven toward the second fluid interface 205 (as shown in FIG. 13) and as fluid is withdrawn from the strut and supplied to the VDS via the second fluid interface 205, the displacement piston 207 will be driven toward the first fluid interface 204 (as shown in FIG. 12). It will also be appreciated that whatever volume of fluid is supplied to the VDS via either interface, the same volume of fluid will be displaced from the VDS via the other interface.

The VDS 200 is configured to accurately monitor or measure the position of the displacement piston 207 by virtue of a sensor magnet 208 mounted to the displacement piston 207 and a position sensor 209 capable of accurately measuring the position of the magnet 208 and thus the position of the displacement piston 207 in the cylinder 201. It will be appreciated that accurate monitoring of the displacement of the displacement piston 207 provides a control system with a theoretical datum of natural position of the strut 100 assuming no external input. This type of monitoring is different to the current state of control systems, which are only able to rely upon measurement of the wheel with respect to the vehicle body and/or hydraulic pressure sensors.

It will be appreciated that by monitoring both the body position and the displacement piston 207 position, a control system is capable of comparing the desired position of the strut 100 with the actual position of the strut (as a result of external input) and supply/remove fluid to/from the strut 100 until the target datum is achieved. By using the VDS, it is possible to command a strut position or spring load relative to the ride height datum. It will further be appreciated that the VDS provides accurate and clean feedback instantaneously without having to filter noisy road input data from a strut position sensor.

It will further be appreciated that although the current embodiment makes use of magnetism to detect the position of the displacement piston 207, other methods may also be employed such as inline position sensors, draw wire sensors, or optical position sensors.

In order to increase the length of the strut 100 using the VDS, the switching valve 337 is deactivated (moved to the spring return position) such that the VDS 200 is in fluid communication with the manifold assembly 300 via the first manifold interface 338. The first control valve 334 is then activated such that fluid is supplied from the high pressure inlet 332 to the first interface 204 of the VDS 200, causing displacement of the displacement piston 207, and an output of fluid from the second interface 205 of the VDS 200 to the fluid interface 107 of the strut 100, resulting in a displacement of the piston assembly and a lengthening of the strut 100. Once the displacement piston 207 reaches its target position, the first control valve 334 is deactivated.

In order to decrease the length of the strut 100, using the VDS the switching valve 337 is deactivated (moved to the spring return position) such that the VDS 200 is in fluid communication with the manifold assembly 330 via the first manifold interface 338. The second control valve 336 is then activated such that fluid is able to drain from the strut 100 by virtue of the weight of the vehicle, resulting in a decrease in the length of the strut. Fluid drains from the fluid interface 107 of the strut 100, in to the second interface 205 of the VDS 200, causing displacement of the displacement piston 207 and an output of fluid from the first interface 204 of the VDS 200 to the manifold assembly 300, where it returns to the pump assembly 310 via the manifold outlet 333.

While in the embodiment shown, the measurement and supply/withdrawal of fluid to/from the strut was achieved through the use of the VDS 200. It will be appreciated that alternate embodiments also capable of measuring the volume of fluid supplied/withdrawn (such as a flow meter, or by calculating flow based on stored pressure and how far valves have been opened) will also be suitable.

The second strut displacement system is used to control static (ride height) displacement of the piston assembly within the hydraulic cylinder. Static ride height adjustment means the length of the strut is lowered or raised to allow aerodynamic advantages, increased ground clearance, passenger/cargo loading, lowering total vehicle height for clearance or ride levelling responsive to variable stationary vehicle load.

The second strut displacement system comprises a direct connection between the second manifold interface 339 and the fluid interface 107 of the strut 100.

Control of static ride height is achieved through the use of one or more vehicle body position sensors (such as control arm sensors, linear potentiometers or optical sensors) which provide feedback to a control system as to the distance between the wheel and vehicle body (i.e. the length of the strut). Hydraulic fluid is either directly supplied to or removed from the strut 100 until the desired ride height is achieved.

In order to increase the static ride height of the strut 100 via the second strut displacement system, the switching valve 337 is activated such that the strut 100 is in direct fluid communication with the manifold assembly 330 via the second manifold interface 339. The first control valve 334 is then activated such that fluid is supplied from the high pressure inlet 332. Once the vehicle reaches its desired ride height, the first control valve 334 is deactivated.

In order to decrease the static ride height of the strut 100 via the second strut displacement system, the switching valve 337 is activated such that the strut 100 is in direct fluid communication with the manifold assembly 330 via the second manifold interface 339. The second control valve 336 is then activated such that fluid is able to drain via the manifold outlet 333. Once the vehicle reaches its desired ride height, the second control valve 336 is deactivated.

It will be appreciated that by virtue of the adjustability of the first and second control valves 334, 336 that the rate at which fluid is supplied/removed from the strut 100 and the corresponding rate at which the length of the strut increases/decreases is able to be controlled to achieve the necessary response to external inputs.

It will further be appreciated that by having separate displacement control systems for static ride height and active displacement, that the displacement piston is able to be returned to a datum position rapidly and accurately without affecting the ride height or strut loads.

It will further be appreciated that other functions may be possible, such as allowing stored pressure within the hydraulic system 300 to discharge, by activation of both the first and second control valves 334, 336.

It will be appreciated above disclosure provides a vehicle suspension system capable of independent ride levelling and dynamic actuation of each strut, while providing accurate control of strut position and command force by virtue of the first and second fluid displacement systems.

While the control of only one strut was described, it will be appreciated that a complete vehicle suspension system will comprise multiple struts and variable displacement systems, each capable of being separately acted upon by the hydraulic system as required by the control system.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A vehicle suspension system comprising:
a hydropneumatic strut comprising a fluid interface, where supply of hydraulic fluid to the strut via the fluid interface causes the overall length of the strut to increase, and withdrawal of hydraulic fluid via the fluid interface causes the overall length of the strut to decrease;
a first displacement system in fluid communication with the fluid interface, capable of supplying and withdrawing fluid to and from the strut as well as measuring the volume of fluid supplied or withdrawn from the strut;
a second displacement system in fluid communication with the fluid interface; and
a hydraulic fluid source for selectively supplying or withdrawing hydraulic fluid from the hydropneumatic strut via either of the first or second displacement systems;
wherein the first displacement system is in the form of a volumetric displacement system comprising:
a cylinder comprising a first fluid interface in fluid communication with the hydraulic fluid source, and a second fluid interface in fluid communication with the fluid interface of the strut;
a piston slidably retained within the cylinder and configured to move along the length of the cylinder between the first and second fluid interfaces in response to fluid displacement in the hydraulic damper; and
a sensor for detecting the position of the displacement piston within the cylinder;
wherein withdrawal of fluid from the strut will cause the displacement piston to move toward the first fluid interface, and supply of fluid to the strut will cause the displacement piston to move toward the second fluid interface, such that the volume of fluid supplied to or withdrawn from the strut is able to be calculated according to the position of the displacement piston within the cylinder; and wherein the suspension system is further configured to selectively connect either of the first or second displacement systems to the hydraulic fluid source.

2. The vehicle suspension system as claimed in claim 1, wherein the hydropneumatic strut further comprises a damper cylinder in connection with the fluid interface and a piston assembly comprising a piston slidably retained within the damper cylinder, a piston rod for driving the piston within the damper cylinder, and a pneumatic spring located within the piston rod, the pneumatic spring comprising a gas chamber filled with a gas and a separator piston slidably retained within the piston rod and configured to separate the hydraulic fluid and the gas, and wherein either the supply or withdrawal of fluid from the damper cylinder causes a displacement of the piston assembly with respect to the damper cylinder, resulting in an increase or decrease in the overall length of the strut.

3. The vehicle suspension system as claimed in claim 2, wherein the hydropneumatic strut further comprises a means for actively controlling bump and rebound damping characteristics.

4. The vehicle suspension system as claimed in claim 2, wherein the first displacement system is used to actively displace the piston assembly in response to road conditions, and the second displacement system is used to control static displacement of the piston assembly.

5. The vehicle suspension system as claimed in claim 1, wherein the volumetric displacement system further comprises a pressure sensor for measuring hydraulic pressure in the strut.

6. The vehicle suspension system as claimed in claim 1, further comprising a hydraulic system for supplying and withdrawing fluid from the first and second fluid displacement systems, the hydraulic system configured to adjustably control the supply or withdrawal of hydraulic fluid to and from the first and second displacement systems.

7. The vehicle suspension system as claimed in claim 6, wherein the hydraulic system comprises a hydraulic pressure source and a hydraulic reservoir, and wherein hydraulic fluid is supplied to the strut by the hydraulic pressure source, and is withdrawn from the strut to the hydraulic reservoir.

* * * * *